United States Patent [19]
Lincke et al.

[11] 3,866,706
[45] Feb. 18, 1975

[54] VEHICLE STEERING ARRANGEMENT

[75] Inventors: Wolfgang Lincke; Walter Zimdahl, both of Wolfsburg; Peter Andreas, Fallersleben; Harald Schimkat, Flechtorf; Hans Kühlborn, Wolfsburg, all of Germany

[73] Assignee: Volkswagenwerk Aktiengesellschaft, Wolfsburg, Germany

[22] Filed: Apr. 15, 1974

[21] Appl. No.: 460,709

[30] Foreign Application Priority Data
May 2, 1973 Germany............................ 2322062

[52] U.S. Cl............................................. 180/79.2 R
[51] Int. Cl............................................... B62d 5/00
[58] Field of Search....................... 180/79.2 R, 79.1

[56] References Cited
UNITED STATES PATENTS
2,957,535 10/1960 Helgeson....................... 180/79.2 R
3,744,587 7/1973 Schimkat....................... 180/79.2 R

*Primary Examiner*—David Schonberg
*Assistant Examiner*—John A. Pekar
*Attorney, Agent, or Firm*—Brumbaugh, Graves, Donohue & Raymond

[57] ABSTRACT

Vehicle steering apparatus having a mechanism for compensating the influence of disturbing lateral forces on the direction of travel. The apparatus includes a reference signal generator for producing a first signal corresponding to the actual lateral acceleration of the vehicle, a reference signal generator for producing a second signal corresponding to the steering commands of the vehicle operator, a reference signal generator for producing a third signal corresponding to the travelling speed of the vehicle, a first logic element for receiving the second and third signals and producing a fourth signal corresponding to the theoretical lateral acceleration of the vehicle which should occur as a result of the vehicle steering commands, and a second logic element for receiving the first and fourth signals and producing a control signal corresponding to the difference between the first and fourth signals. A steering regulator system is also provided for regulating the steering mechanism of the vehicle in accordance with the control signal.

7 Claims, 6 Drawing Figures

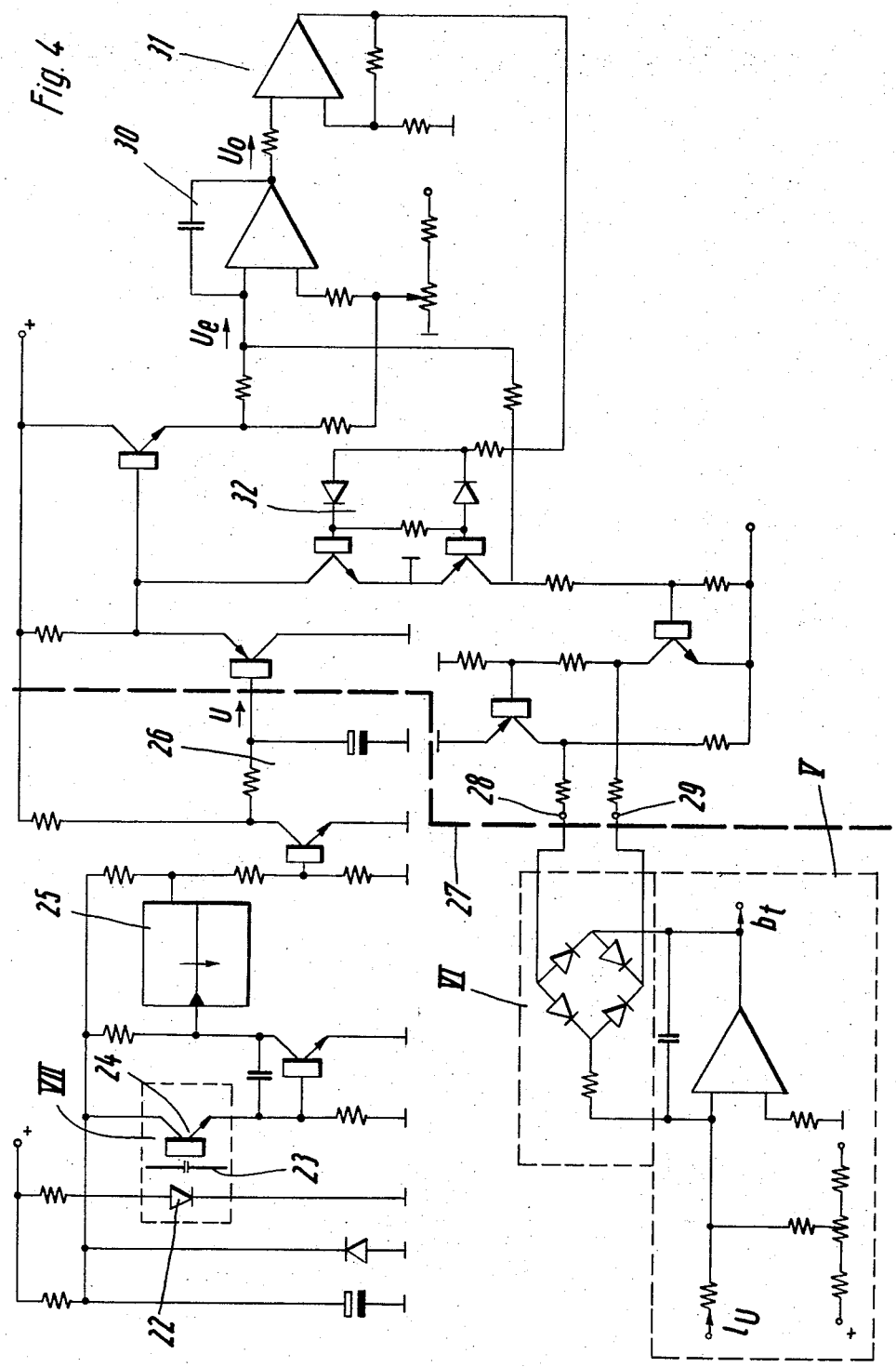

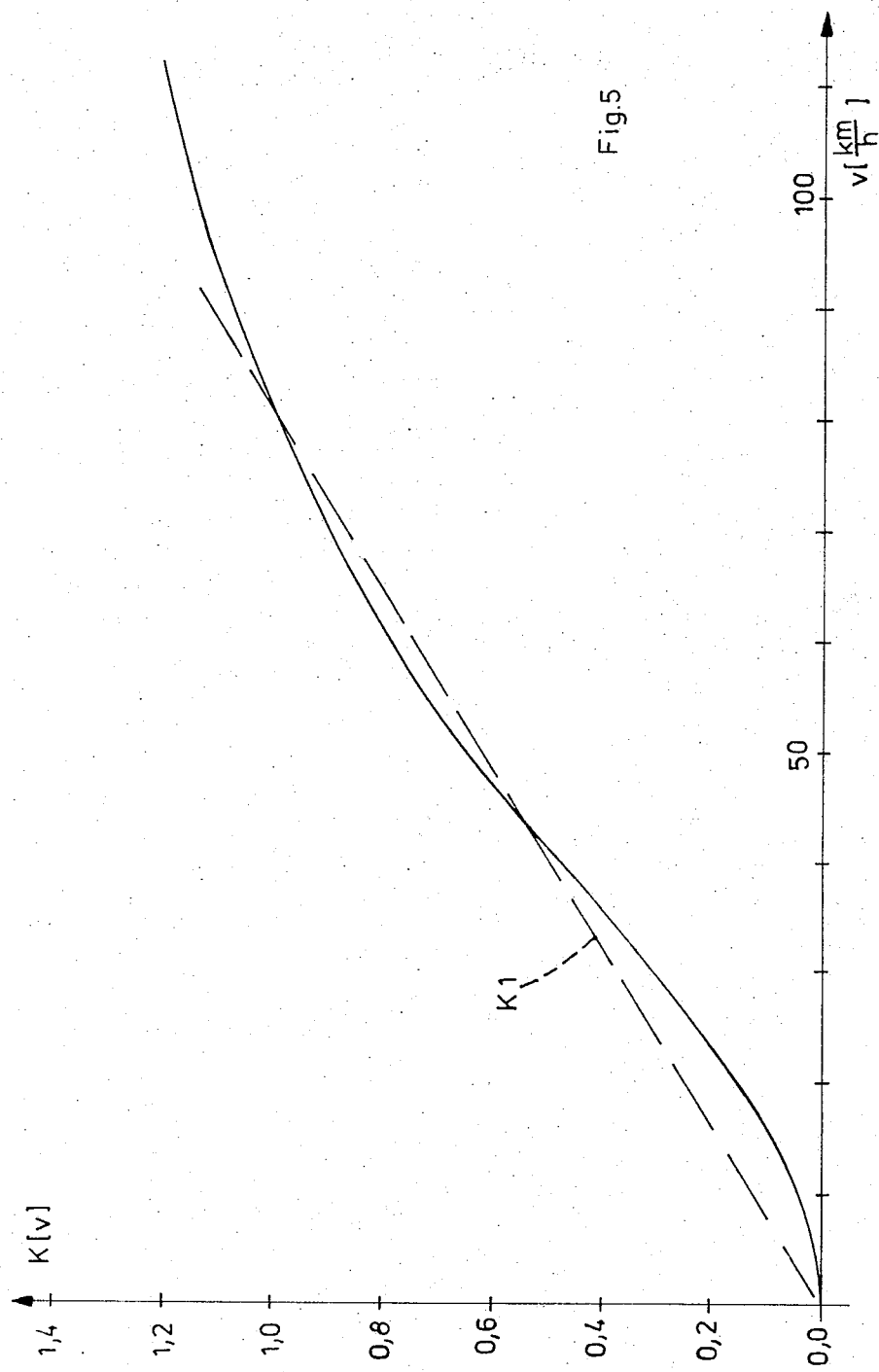

VEHICLE STEERING ARRANGEMENT

BACKGROUND OF THE INVENTION

The present invention relates generally to vehicle steering apparatus and, more particularly, it relates to steering apparatus having a compensating mechanism for fully or partially eliminating the effects of undesired transverse forces acting on a vehicle.

The U.S. Pat. No. 3,744,587 discloses a steering arrangement for vehicles having a control or regulating means for compensating the influence of disturbing side forces on the travelling direction. The regulating means includes a first reference signal generator for producing signals corresponding to an occurring lateral acceleration; a second reference signal generator for producing signals corresponding to the steering commands of the vehicle operator and a logic element, or so-called "coupling member," which controls the steering of the vehicle. The steering command signals from the second reference signal generator are modified in dependence upon the forward speed of the vehicle and applied, together with the signals from the first reference signal generator, to the input side of the logic element. The logic element derives a control signal from the difference between the two input signals and applies it to a first regulator device that is coupled to and controls the vehicle steering servo-mechanism. In this system, the arrangement for modifying the steering command signals in dependence upon the vehicle travelling speed serves to achieve a desired travelling stability in which the vehicle oversteers or understeers at particular speeds.

The steering arrangement disclosed in the aforementioned U.S. Pat. No. 3,744,587 is an improvement on an arrangement disclosed in the German Pat. No. 1,041,818. Whereas, with the latter system, the logic element is designed in such a manner that it produces a control signal corresponding to the sum of the signals applied to it, the arrangement disclosed in the U.S. Pat. No. 3,744,587 offers the advantage that transverse accelerations which result from the steering command signals of the vehicle operator do not, in principle, generate a control signal, and therewith an opposing steering force, in the steering servo-mechanism. In this improved system, in which the logic element forms the difference, only transverse accelerations caused by disturbing lateral forces, such as crosswinds, uneven roadways and the like, result in an actuation of the steering servo-mechanism to oppose their effect.

Even in the steering arrangement disclosed in the U.S. Pat. No. 3,744,587, however, difficulties may arise in that the automatic evaluation, as to whether lateral accelerations are due to intentional steering control signals or to undesirable forces acting transversely to the vehicle, must be achieved precisely within a comparatively wide range of vehicle forward speeds.

SUMMARY OF THE INVENTION

It is an object of the present invention, therefore, to provide a vehicle steering arrangement of the type disclosed in the aforementioned U.S. Pat. No. 3,744,587 which can ensure that the automatic evaluation of lateral accelerations, as described above, is precisely achieved.

This object, as well as other objects which will become apparent in the discussion that follows, are achieved, according to the present invention, by providing a steering arrangement having means for producing a first signal corresponding to the actual lateral acceleration of the vehicle, means for producing a second signal corresponding to the steering commands of the vehicle operator, means for producing a third signal corresponding to the travelling speed of the vehicle, a first logic element for receiving the second and third signals and producing a fourth signal corresponding to the theoretical lateral acceleration of the vehicle which should occur as a result of the vehicle steering commands, and a second logic element for receiving the first signal and fourth signal and producing a control signal corresponding to the difference between the first and fourth signals. This control signal is then supplied to a steering regulator system which regulates the steering servo-mechanism of the vehicle in accordance with the control signal.

Thus, whereas in the known steering arrangement disclosed in the U.S. Pat. No. 3,744,587, referred to above, a control signal which is a function of the forward speed of the vehicle is supplied to a steering regulator in such a manner that the vehicle has the desired travel stability at various speeds, the apparatus according to the present invention may be viewed as a vehicle model that simulates the significant vehicle parameters reflecting the physical characteristics of the particular vehicle or vehicle type. The first logic element employed in accordance with the invention determines, from the steering command signal ("second signal") and the vehicle forward speed signal ("third signal"), the transverse acceleration that would have to be present in the operation of the vehicle if the vehicle were free from interfering lateral forces. The signal ("fourth signal") corresponding to this calculated theoretical acceleration is compared in the second logic element with the signal ("first signal") representing the actual transverse acceleration of the vehicle so that, as occurs in the known steering arrangement disclosed in the U.S. Pat. No. 3,744,587, a regulating or control signal calling for a steering force opposing the interfering lateral forces is applied to the steering servo-mechanism only when interfering lateral forces are actually present. The design of the steering arrangement in accordance with the invention ensures that this compensation effect, which operates through the transverse acceleration caused by the steering commands, occurs within a speed range that is dependent upon the quality of the simulation of the driving parameters.

It should be emphasized that a number of acceleration sensors, or means for generating "first signals" corresponding to the actual lateral acceleration of a vehicle, may be provided at various points on the vehicle. In a suitable arrangement, however, a single such sensor is sufficient. In order for the sensor to deliver a signal with the correct sign when the vehicle rotates or turns sideways with respect to the travelling direction, as may occur, for example, on slippery or icy roads, to permit counteraction by the power steering arrangement, the sensor is preferably located at a point forward of the center of gravity of the vehicle.

In the preferred embodiment of the present invention, the first logic element contains a multiplier element that provides an output to the second logic or coupling element. A "time" element and a "function" element are connected to receive the steering command signal and vehicle speed signal, respectively, and to apply an appropriate output to the multiplier element. The time element and the function element each have a transfer function which depends upon the forward speed of the vehicle in such a manner that the product of their output signals corresponds, at least approximately, to the theoretical, ideal transverse acceleration of the vehicle. Generally, these transfer functions will be nonlinear. Additional physical parameters, such as the height of the center of gravity of the vehicle, may be taken into account, for example, in the transfer function of the function element. The time element contains a time constant which reflects vehicle parameters such as the vehicle mass.

As an example, time element and the function element may be formulated in such a manner that the function element has a transfer function $1/F(v)$ and the time element a transfer function $[1 + T \cdot s/F(v)]^{-1}$, where $F(v)$ is an experimentally determined function of the vehicle forward speed $v$, T is a time constant incorporating vehicle parameters such as mass, and s is the observed complex frequency in the steering command signal.

If we assume that the transfer functions of the time element and the function element relative to the forward speed of the vehicle can each be represented, approximately, by a straight line, though of differing slope, where the positions and slopes of the straight lines are measured experimentally for the vehicle in question, it is possible to obtain a sufficiently precise simulation of the vehicle with the first logic element if this element is realized by an integrator having a constant of integration equal to T and a feedback circuit containing the function $F(v)$. In a preferred embodiment of the steering apparatus in accordance with the invention the feedback circuit is formed by a repeatedly actuated electronic switch that is operated with a pulse duty factor dependent upon the forward speed of the vehicle.

BRIEF DESCRIPTION OF THE DRAWINGS

FIG. 4 is a schematic diagram of an exemplary circuit which may be used in the embodiment of FIG. 3.

FIG. 5 is a representation of a transfer function for a vehicle.

DESCRIPTION OF THE PREFERRED EMBODIMENTS

Figure 1:
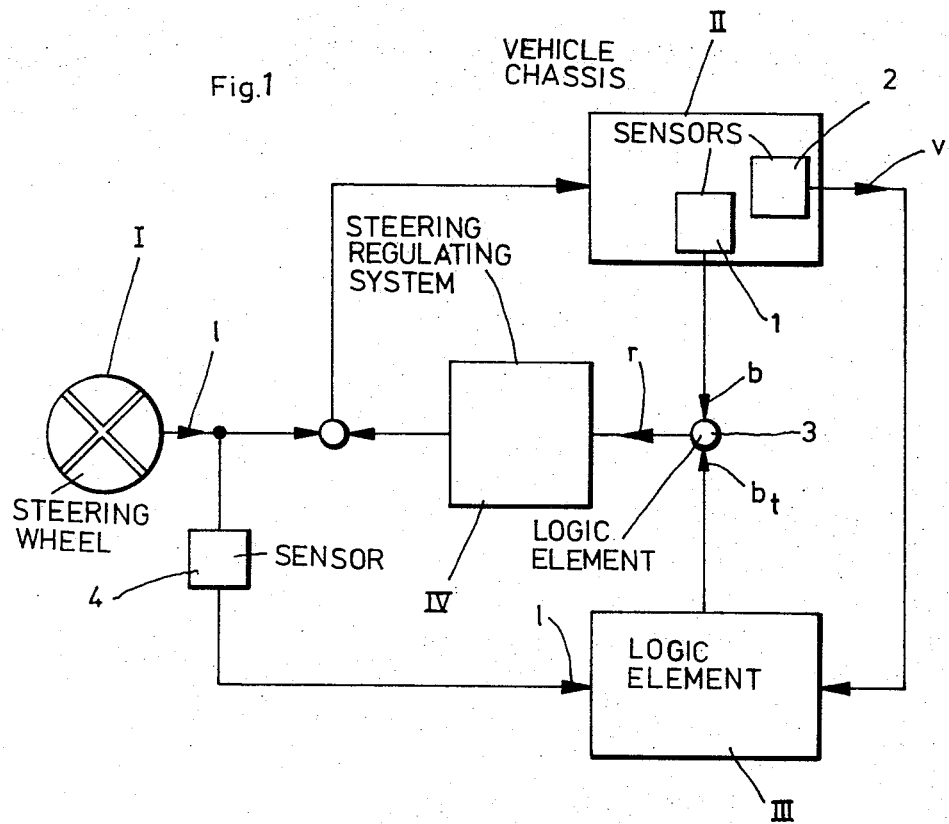
FIG. 1 is a block diagram illustrating the operation of steering apparatus in accordance with the present invention.

The preferred embodiments of the present invention will now be described in connection with FIGS. 1–4. Identical elements which are illustrated in these four figures are designated with the same reference numerals.

FIG. 1 illustrates the essential components of the steering apparatus in accordance with the invention. In this instance the apparatus is intended for an automobile but it may also be used in other vehicles not designed to run on rails. The apparatus includes a steering command element or pickup I, in this case a steering wheel; the vehicle proper II; a device III which serves as a vehicle model or vehicle simulator; and a regulating system IV comprising a steering servo-mechanism or power device and other elements.

In the embodiment shown, the vehicle proper II incorporates two reference signal generators or sensors 1 and 2. The first sensor 1 applies a signal to a logic element 3 corresponding to the instantaneous lateral or transverse acceleration $b$ of the vehicle. The sensor 2 produces, and applies to a logic element III, a signal corresponding to the prevailing forward speed of the vehicle. A further reference signal generator or sensor 4 applies to the logic element III a signal corresponding to the instantaneous steering commands $l$ of the driver. The logic element III is designed to evaluate the steering commands $l$ in accordance with the prevailing speed $v$ of the vehicle, and to supply to the logic element 3 a signal which, under ideal driving conditions, corresponds theoretically to the lateral transverse acceleration $b_t$ of the vehicle to be expected as a result of the steering commands.

The logic element 3 is designed to produce a control signal $r$, the phase and amplitude of which is determined by the phase and magnitude of the difference of the two signals representing the accelerations $b$ and $b_t$, respectively. If the first acceleration sensor 1 and the logic element III are designed such that the signals they produce are of opposite sign, the logic element 3 forms the sum of these signals; otherwise the logic element 3 forms the difference of the signals supplied to it.

As a result of the evaluation of the steering commands $l$ in the logic element III as a function of speed that is, as a result of the derivation of the signal $b_t$ by the logic element III — lateral or transverse vehicle accelerations caused by driver-originated steering forces are compensated in the logic element 3 over a wide, and possibly the entire, speed range of the vehicle so that the control signal $r$ does, in fact, cause a decrease or, in the ideal case, a neutralization of the effect of any unwanted or interferring lateral forces exerted on the vehicle.

Figure 2:
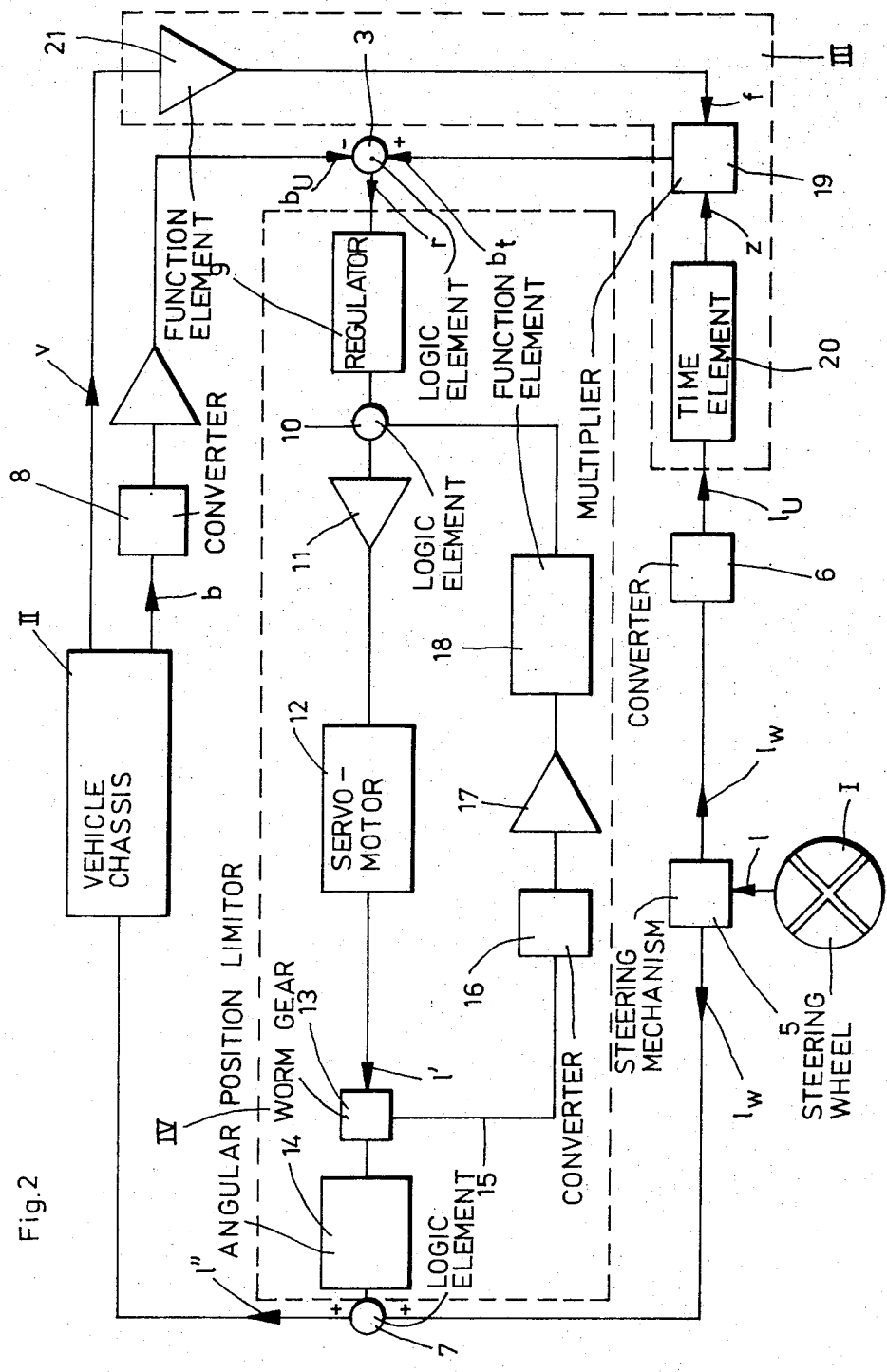
FIG. 2 is a block diagram illustrating a preferred embodiment of the apparatus of FIG. 1.

As shown in FIG. 2, the steering commands $l$ produced by the steering wheel I are converted into a mechanical signal $l_w$ of angular position at the steering mechanism 5. The signal $l_w$ is applied to a converter or transducer 6 which transforms it into voltage $I_U$. In addition, the mechanical signal $l_w$ is applied to a logic element 7 which adds it to the output steering signal $l'$ produced by the regulating system IV. The sum $l''$ of both $l_w$ and $l'$ is then supplied to the steering mechanism of the vehicle II.

The signal corresponding to the instantaneous actual lateral or transverse acceleration $b$ of the vehicle produced by the sensor 1 is transformed into a voltage signal $b_U$ in a transducer or converter 8. This signal, as well as the signal corresponding to the theoretical acceleration $b_t$ are applied in the described manner to the logic element 3.

The regulating system IV in the embodiment shown comprises the actual regulator 9, a further logic element 10, an amplifier 11 and a servomotor 12. The servomotor 12, which produces the steering correction signal $l'$ corresponding to the control variable $r$, does not act directly on the logic element 7 but, rather, does so through the intermediary of a worm gear 13 and an angular position limiter 14. The worm gear 13 prevents the introduction of steering commands from the vehicle into the regulating system, whereas the angular position limiter 14 serves to limit steering correction signals $l'$ which may be produced erroneously, for example due to a defect in the regulating system.

The worm gear 13 is employed as a further "logic element" insofar as it originates a feedback signal 15 for the regulating system IV. The feedback signal is changed in a transducer or converter 16 from a mechanical signal of angular position to a voltage; it is amplified in the amplifier 17 and provided in the function element 18 with a time constant that matches the conditions of the servomotor 12. In one embodiment of the invention element 18 has a transfer function $1+t \cdot s$, time constant $t$ being 10 ms and $s$ being a complex frequency.

The structure of the logic element III is of particular interest because it incorporates, in part, the basic teaching of the present invention. The logic element III in this embodiment consists of the multiplier element 19 to which is applied a signal corresponding to the steering commands in the form of a signal 3, which is proportional to the signal $l_U$ after modification by a time element 20, and a signal f corresponding to the speed $v$ of the vehicle as modified in accordance with a transfer function built into a function element 21. Due to the transfer functions of the time element 20 and the function element 21, respectively, the signals $z$ and $f$ are such that the product of these signals and, thus, the output signal $b_t$ corresponds over a wide range of vehicle forward speeds to the ideal lateral or transverse acceleration of the vehicle; that is, that lateral acceleration which is solely due to the instantaneous steering commands $l$.

As has been actually determined in an experimental embodiment of the invention, the transfer functions of the time element 20 and the function element 21 can both be represented by straight lines, the slopes of which are determined empirically such that one obtains an acceleration value $b_t$ that conforms with sufficient precision to the actual conditions. The transfer function of the function element 21 may then be chosen to be $1/F(v)$, where $F(v)$ is a function of vehicle speed to be determined, and the transfer function of the time element 20 may be chosen as $[ 1+ T \cdot s/F(v) ]^{-1}$, where $F(v)$ is the aforementioned function, T is a time constant determined by vehicle characteristics such as the vehicle mass, and $s$ is the observed complex frequency of the steering command signals. The transfer function of the function element 21 can be written as $1/F(v) = K(v) \cdot v + 1$, wherein $K(v)$ is also a function of vehicle speed to be determined empirically for the vehicle equipped with the invention. The curve in FIG. 5 is the measured relation between $K(v)$ and $v$ (in km/h) for a small transportation car. As will be noted, the curve can at least within regions be approximated by a straight line indicated by the dashed line K1.

Time constant T for this car has been determined empirically as $T=6,2$ ms.

As to the complex frequency s, it is well known that a curve can be described by frequencies (Fourier-analysis). This is true also for the curve showing the relationship between the angle of movement of the vehicle and the steering command, that is the angle of rotation of the steering wheel. So s is one of the frequencies describing the curve.

If $1/F(v)$ can be approximated by a straight line, this is true also for $(1 + T \cdot s/F(v) )- 1$.

Figure 3:
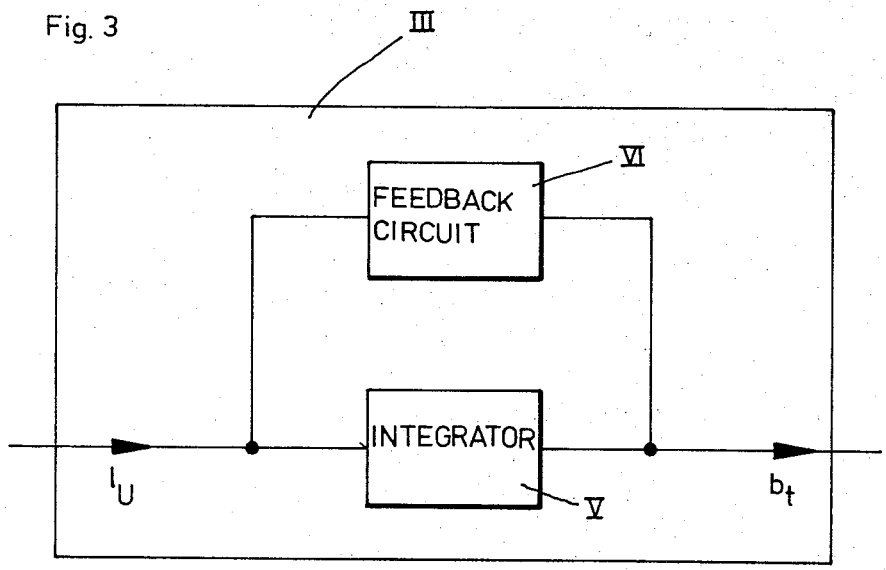
FIG. 3 is a block diagram illustrating a preferred embodiment of a portion of the apparatus of FIG. 2.

As shown in FIG. 3, the entire logic element III can be designed simply as an integrator with feedback. The integrator itself is designated by the reference numeral V; its feedback circuit is designated with reference numeral VI. The constant of integration equals the aforementioned time constant T so that the integrator functions in accordance with the relation $1/T \cdot s$. The feedback circuit contains an element with the transfer function $F(v)$ which may be constituted by an electronic switch as is indicated within the block VI in FIG. 4. The switch is repeatedly actuated with a duty cycle that is dependent upon the instantaneous travelling speed $v$ of the vehicle.

In order to obtain a signal which is a function of the speed $v$, the circuit of FIG. 4 includes a device VII containing, as essential components, a radiation-emitting diode 22, a perforated plate 23 that rotates with an angular speed proportional to the instantaneous forward speed of the vehicle, and a phototransistor 24. The pulses of radiation that pass through the perforations in the plate 23 are converted into electrical pulses by the transistor 24 and applied to a monostable multivibrator 25. The pulses produced by the monostable multivibrator 25 are converted by means of a low-pass filter 26 into an analog voltage U corresponding to the speed $v$.

The portion of the circuit to the right of the dashed line 27 in FIG. 4 is individually designed for a specific vehicle or vehicle type. This portion of the circuit provides signals at the terminals 28 and 29 for driving the switch VI with a pulse duty factor determined by the analog voltage representing the instantaneous speed $v$.

Figure 6:
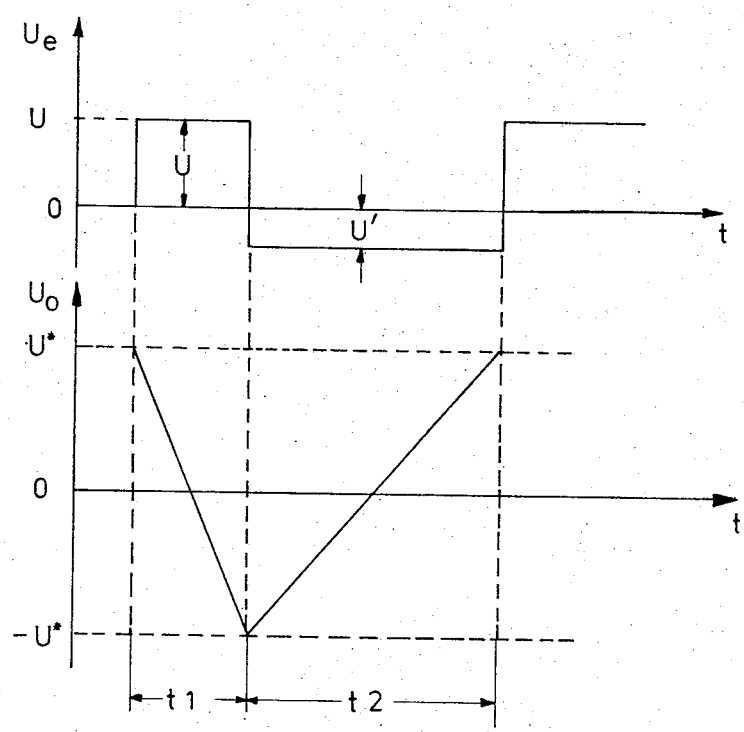
FIG. 6 is a representation of a translation performed by a portion of the circuit shown in FIG. 4.

This translation of the analog voltage U in a pulse duty factor or keying ratio is achieved by integrator 30 and comparator 31. The first diagramm of FIG. 6 shows the voltage $U_e$ at the entrance of integrator 30, the second diagramm the output voltage $U_o$ of the integrator versus time $t$. Starting at an output voltage $U^*$, the integrator input voltage is U, but only until the output voltage $U_o$ equals $-U^*$. $U^*$ must be determined empirically for the vehicle. When $U_o$ reaches $-U^*$, comparator 31 via network 32 changes the input voltage from positive voltage U to constant negative voltage $U'$, which also has to be determined with respect to the vehicle. Of course this integrating process between $U^*$ and $-U^*$ is repeated. The result is a pulse duty factor represented by the time intervalls $t1$ and $t2$ depending from the velocity $v$ and the vehicle.

For the car referred to above the constant time $t1+t2$ is approximately 1ms, $U'$ is $-15$ V and $U^*$ is $\pm 4,5$ V.
p It will be understood that the present invention is susceptible to various changes, modifications and adaptations as will occur to those skilled in the art. For example, the present invention does not exclude the possibility that, as in the steering arrangement disclosed in the U.S. Pat. No. 3,744,587 referred to above, further speed-dependent signals be applied to the individual component groups of the regulating circuit for obtaining certain prescribed results.

If the steering apparatus according to the invention is designed in such a manner that the signal corresponding to the theoretical transverse accelerations $b_t$ intentionally deviates somewhat from the pertinent vehicle parameters, it is possible to thereby achieve an intentional modification of the vehicle steering behavior. Such modification is therefore also intended to fall within the scope of the present invention.

It is preferable, in accordance with the invention, that the sensor 1 be located on the vehicle at a point forward of the vehicle center of gravity since such arrangement permits the sensing of vehicle rotations about its center of gravity. In this connection it should be emphasized that lateral or transverse accelerations within the meaning of the present invention include not only accelerations resulting from a translational movement of the vehicle, but any and all accelerations occurring at the location of the sensor 1 and sensed by it.

It is therefore intended that the present invention be limited only by the following claims.

We claim:

1. Vehicle steering apparatus having means for compensating the influence of disturbing lateral forces on the direction of travel, said apparatus comprising, in combination:
    a. first reference signal generator means for producing at least one first signal corresponding to the actual lateral acceleration of the vehicle;
    b. second reference signal generator means for producing at least one second signal corresponding to the steering commands of the vehicle operator;
    c. third reference signal generator means for producing at least one third signal corresponding to the travelling speed of the vehicle;
    d. first logic means connected to said second and third generator means for receiving said second and third signals and producing at least one fourth signal corresponding to the theoretical lateral acceleration of the vehicle which should occur as a result of the vehicle steering commands;
    e. second logic means connected to said first generator means and to said first logic means for receiving said first and fourth signals and producing a control signal corresponding to the difference between said first and fourth signals; and
    f. steering regulator means connected to said second logic means for regulating the steering servomechanism of the vehicle in accordance with said control signal.

2. The steering apparatus defined in claim 1, wherein said first logic means includes:
    1. time element means connected to said second generator means for producing a fifth signal in dependence upon said second signal;
    2. function element means connected to said third generator means for producing a sixth signal in dependence upon said third signal; and
    3. multiplier element means connected to said time element means and to said function element means for producing said fourth signal in dependence upon the product of said fifth and sixth signals, said time element means and said function element means having transfer functions such that said fourth signal corresponds, at least approximately, to the theoretical, ideal lateral acceleration of the vehicle.

3. The steering apparatus defined in claim 2, wherein said time element means has a transfer function equal to $$[1 + T \cdot s/F(v)]^{-1}$$

and said function element means has a transfer function equal to $$1/F(v);$$

where $v$ is travelling speed of the vehicle,
$F(v)$ is a function of the travelling speed determined experimentally for the vehicle,
$T$ is a time constant determined by the vehicle characteristics, and
$s$ is the observed complex frequency in said second signal.

4. The steering apparatus defined in claim 3, wherein said first logic means includes integrator means having a constant of integration equals to $T$ and feedback means, coupling the output to the input of said integrator means, having a transfer function dependent upon $F(v)$.

5. The steering apparatus defined in claim 4, wherein said feedback means includes switch means which is actuated in dependence upon the vehicle travelling speed.

6. The steering apparatus defined in claim 1, wherein said steering regulator means includes means for maintaining the steering angle of the vehicle within prescribed limits notwithstanding the regulation of the steering servo-mechanism.

7. The steering apparatus defined in claim 1, wherein said first signal generator means includes acceleration sensor means located on the vehicle forward of the vehicle center of gravity.

* * * * *